US012691734B2

(12) United States Patent
Cho et al.

(10) Patent No.: US 12,691,734 B2
(45) Date of Patent: Jul. 28, 2026

(54) SLIDING GLASS MODULE AND REAR SLIDING GLASS ASSEMBLY INCLUDING SAME

(71) Applicants: Hyundai Motor Company, Seoul (KR); Kia Corporation, Seoul (KR); Webasto Korea Holdings Ltd., Ulsan (KR)

(72) Inventors: Sung Yong Cho, Hwaseong-si (KR); Keon Han Kang, Ulsan (KR); Ki Jin Nam, Ulsan (KR); Chu Kyoung Kim, Ulsan (KR)

(73) Assignees: Hyundai Motor Company, Seoul (KR); Kia Corporation, Seoul (KR); Webasto Korea Holdings Ltd., Ulsan (KR)

( * ) Notice: Subject to any disclaimer, the term of this patent is extended or adjusted under 35 U.S.C. 154(b) by 0 days.

(21) Appl. No.: 19/097,202

(22) Filed: Apr. 1, 2025

(65) Prior Publication Data

US 2026/0145491 A1       May 28, 2026

(30) Foreign Application Priority Data

Nov. 28, 2024    (KR) ........................ 10-2024-0173766

(51) Int. Cl.
| | |
|---|---|
| *B60J 1/18* | (2006.01) |
| *B60R 16/03* | (2006.01) |
| *H05B 3/86* | (2006.01) |
| *H01R 41/00* | (2006.01) |

(52) U.S. Cl.
CPC ............. *B60J 1/1853* (2013.01); *B60R 16/03* (2013.01); *H05B 3/86* (2013.01); *H01R 41/00* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 4,918,384 | A * | 4/1990 | Giringer ................ | H01R 11/18 |
| | | | | 324/755.05 |
| 6,014,840 | A * | 1/2000 | Ray .......................... | H05B 3/84 |
| | | | | 49/413 |
| 6,586,709 | B2 * | 7/2003 | Kim ........................ | H05B 3/84 |
| | | | | 219/541 |
| 6,793,259 | B2 * | 9/2004 | Sano ................... | B60R 16/0207 |
| | | | | 49/502 |
| 6,930,244 | B1 * | 8/2005 | Nebel ................ | B60R 16/0207 |
| | | | | 248/65 |

(Continued)

FOREIGN PATENT DOCUMENTS

| | | | | |
|---|---|---|---|---|
| BR | 112014000986 B1 * | 3/2021 | ............ | B60J 1/1861 |
| CN | 109367365 A * | 2/2019 | ............. | B60S 1/586 |

(Continued)

*Primary Examiner* — Catherine A Kelly
(74) *Attorney, Agent, or Firm* — Slater Matsil, LLP

(57) ABSTRACT

A sliding glass system can include a rail, a sliding glass portion including a heating wire and slidably connected to the rail, an electrically conductive busbar on the rail and configured to be connected to an external power source, and a pin module electrically connecting the busbar to the heating wire, wherein the pin module is configured to maintain contact with the busbar while the sliding glass portion moves.

20 Claims, 20 Drawing Sheets

(56)                References Cited

U.S. PATENT DOCUMENTS

| | | | | | |
|---|---|---|---|---|---|
| 7,155,863 | B2 * | 1/2007 | Daniel | .................... | B60J 1/1853 |
| | | | | | 292/DIG. 6 |
| 7,265,294 | B2 * | 9/2007 | Tsunoda | ................. | H02G 11/00 |
| | | | | | 174/72 A |
| 7,381,898 | B2 * | 6/2008 | Ide | ....................... | H02G 11/006 |
| | | | | | 174/72 A |
| 7,568,312 | B2 * | 8/2009 | Dufour | ................. | B60J 1/1853 |
| | | | | | 49/413 |
| 8,042,664 | B2 * | 10/2011 | Rutkowski | ............. | H02G 11/02 |
| | | | | | 191/12.2 A |
| 8,402,695 | B2 * | 3/2013 | Smith | .................... | B60J 1/1853 |
| | | | | | 49/413 |
| 8,479,447 | B2 * | 7/2013 | Liebscher | ............. | E05F 15/635 |
| | | | | | 49/425 |
| 8,881,458 | B2 * | 11/2014 | Snider | ....................... | E05C 1/08 |
| | | | | | 49/213 |
| 9,579,955 | B2 * | 2/2017 | Snider | .................... | B60J 1/1853 |
| 9,688,122 | B2 * | 6/2017 | Gipson | .................... | H05B 3/84 |
| 9,894,717 | B2 * | 2/2018 | Ash, Jr. | .................... | H05B 3/84 |
| 9,920,560 | B2 * | 3/2018 | Gipson | .................... | H05B 3/84 |
| 10,015,843 | B2 * | 7/2018 | Ackerman | ............... | H05B 3/84 |
| 10,407,001 | B2 * | 9/2019 | Kogure | ................. | B60R 16/03 |
| 10,524,313 | B2 * | 12/2019 | Snider | .................. | B32B 17/061 |
| 10,882,382 | B2 * | 1/2021 | Otsubo | .................. | E05F 11/04 |
| 11,013,069 | B2 * | 5/2021 | Lahnala | ................. | E05F 11/535 |
| 11,458,819 | B2 * | 10/2022 | Kim | ........................... | B60J 1/16 |
| 2005/0044798 | A1 * | 3/2005 | Daniel | .................... | B60J 1/1853 |
| | | | | | 49/413 |
| 2006/0254797 | A1 * | 11/2006 | Charara | ................. | H02G 11/00 |
| | | | | | 174/72 A |
| 2011/0030276 | A1 * | 2/2011 | Smith | .................... | H01R 35/02 |
| | | | | | 49/70 |
| 2012/0117880 | A1 * | 5/2012 | Lahnala | ................. | B60J 1/1853 |
| | | | | | 49/70 |
| 2012/0291353 | A1 * | 11/2012 | Gipson | .................... | B60S 1/026 |
| | | | | | 49/70 |
| 2023/0084191 | A1 * | 3/2023 | Snider | ...................... | H05B 3/84 |
| | | | | | 296/146.16 |
| 2025/0026185 | A1 * | 1/2025 | Snider | .................... | B60S 1/026 |

FOREIGN PATENT DOCUMENTS

| | | | | | | |
|---|---|---|---|---|---|---|
| DE | | 19949453 | A1 | * | 3/2001 | ............ E05F 15/632 |
| DE | | 112017002492 | T5 | * | 2/2019 | ........ B60R 16/0215 |
| EP | | 2616259 | B1 | * | 4/2019 | ............... H05B 3/84 |
| JP | | S6160345 | A | * | 3/1986 | ........... E05F 11/445 |
| JP | | S6160346 | A | * | 3/1986 | ........ B60R 16/0207 |
| WO | WO-2004034540 | A1 | | * | 4/2004 | ............... B60N 2/06 |
| WO | WO-2006013884 | A1 | | * | 2/2006 | ........ B60R 16/0215 |
| WO | WO-2015014712 | A1 | | * | 2/2015 | ............... B60J 1/16 |

* cited by examiner

SLIDING GLASS MODULE AND REAR SLIDING GLASS ASSEMBLY INCLUDING SAME

CROSS-REFERENCE TO RELATED APPLICATIONS

This application claims benefit of priority to Korean Patent Application No. 10-2024-0173766 filed on Nov. 28, 2024 in the Korean Intellectual Property Office, the disclosure of which is incorporated herein by reference in its entirety.

TECHNICAL FIELD

The present disclosure relates to a sliding glass module and a rear sliding glass assembly including the same.

BACKGROUND

A rear glass is mainly installed on the rear of a pickup truck cabin and has a feature in which a portion of the window connecting the inside and the outside of a vehicle may be opened and closed in a sliding manner. Such a rear glass includes, for example, a fixed glass fixed to the rear of the vehicle, a sliding glass provided to be slidable from the fixed glass to open and close an opening formed in the fixed glass, a wiring harness supplying power to a heating wire formed in the fixed glass and the sliding glass, and a rail guiding the movement of the sliding glass.

SUMMARY

An embodiment of the present disclosure can provide a sliding glass module with improved water-tightness and a rear sliding glass assembly including the same.

An embodiment of the present disclosure can provide a sliding glass module capable of stably connecting a wiring harness and a heating wire and a rear sliding glass assembly including the same.

An embodiment of the present disclosure can provide a sliding glass module with improved product appearance and a rear sliding glass assembly including the same.

According to an embodiment of the present disclosure, a sliding glass module can include: a rail; a sliding glass portion including a heating wire and slidably connected to the rail; a busbar provided on the rail and connected to an external power source; and a pin module electrically connecting the busbar to the heating wire, wherein the pin module is maintained in contact with the busbar when the sliding glass moves According to an embodiment of the present disclosure, a rear sliding glass assembly can include: a fixed glass module installed in a vehicle and having an opening; and a sliding glass module connected to the fixed glass module capable of opening and closing the opening.

BRIEF DESCRIPTION OF THE DRAWINGS

The above and other features and advantages of example embodiments of the present disclosure can be more clearly understood from the following detailed description, taken in conjunction with the accompanying drawings, in which.

DETAILED DESCRIPTION OF ILLUSTRATIVE EMBODIMENTS

Figure 1:
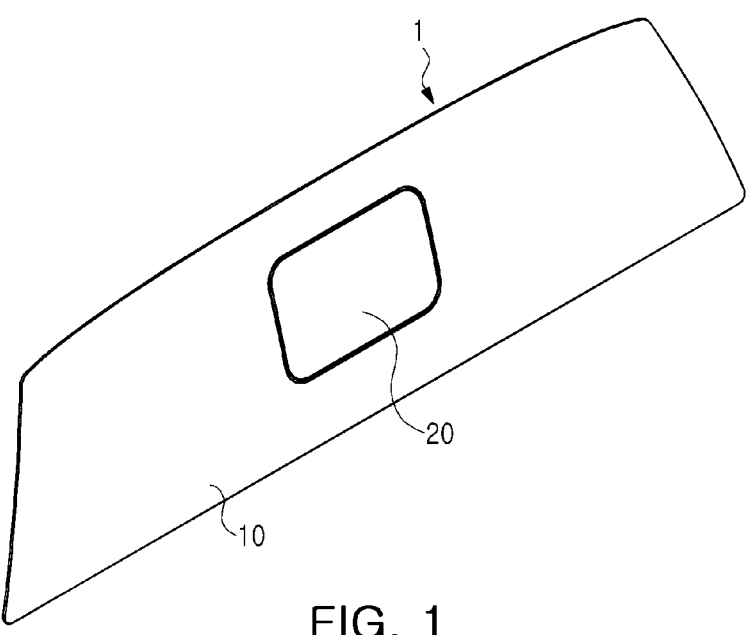
FIG. 1 is an external perspective view of a rear sliding glass assembly according to an embodiment of the present disclosure.

Embodiments of the present disclosure may be modified in various ways and take on various alternative forms, and example embodiments thereof are shown in the drawings and described in detail below. However, it can be understood that there is no intent to necessarily limit the present disclosure to the particular forms disclosed, but on the contrary, the present disclosure covers all modifications, equivalents, and alternatives falling within the spirit and scope of the present disclosure.

It can be understood that, although the terms "first," "second," etc. may be used herein to describe various elements, these elements are not necessarily limited by these terms. These terms can be used merely to distinguish one element from another. For example, a first element could be termed a second element, and a second element could similarly be termed a first element without departing from the scope of the present disclosure. As used herein, the term "and/or" includes any and all combinations of one or more of the associated listed items.

The terms used herein to describe example embodiments of the present disclosure are not intended to necessarily limit the scopes of the present disclosure. The articles "a," and "an" are singular in that they have a single referent, however the use of the singular form in the present document does not necessarily preclude the presence of more than one referent. In other words, elements of an example embodiment of the present disclosure referred to in the singular may number one or more, unless the context clearly indicates otherwise. It can be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, terms used herein, including technical and scientific terms, can have same meanings as understood by those skilled in the art to which the present disclosure pertains. Such terms as defined in generally used dictionaries can be construed to have same meanings as those of the contexts of the related art.

In the description below, terms "forward," "backward," "lateral," "front," "rear," "vertical," "above," "upper," "lower," "horizontal," etc. used in relation to directions are described based on the illustration in the drawing. Hereinafter, example embodiments of the present disclosure will be described with reference to the accompanying drawings.

Figure 2:
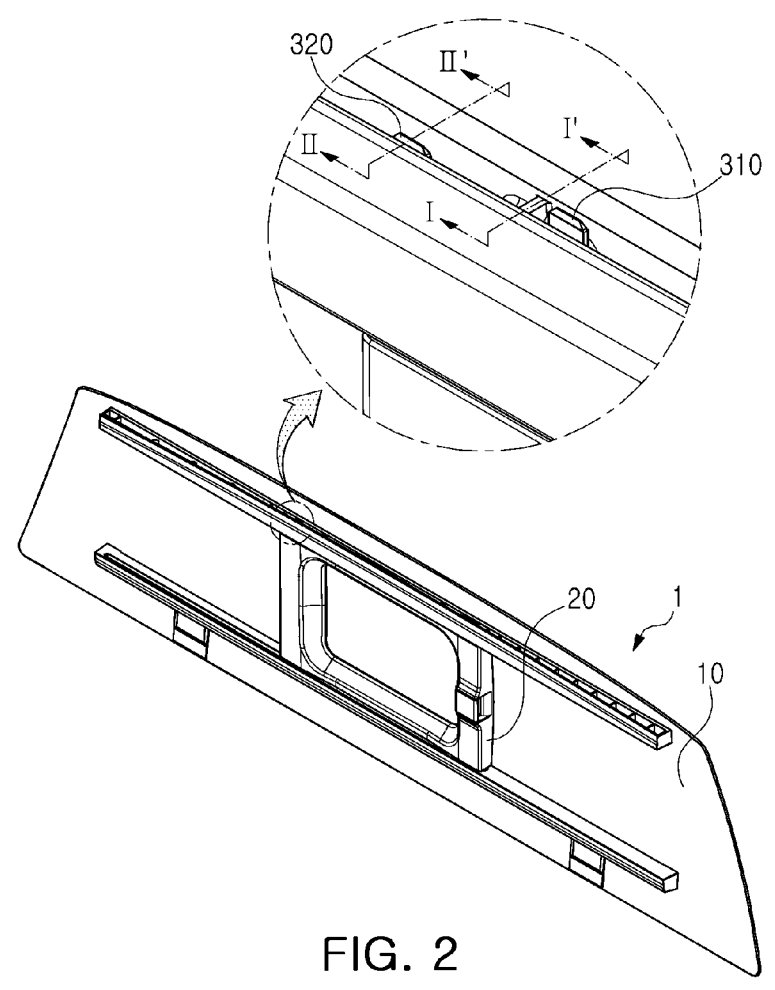
FIG. 2 is an internal perspective view of a rear sliding glass assembly according to an embodiment of the present disclosure.
Figure 3:
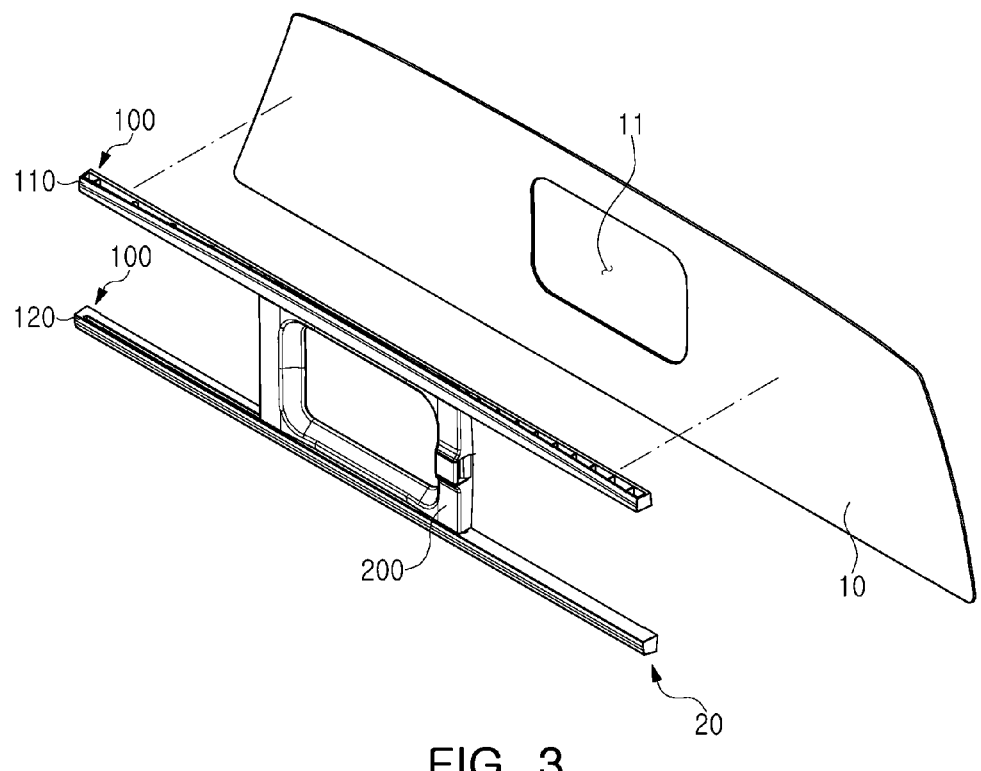
FIG. 3 is an exploded perspective view of a rear sliding glass assembly according to an embodiment of the present disclosure.

FIG. 1 is an external perspective view of a rear sliding glass assembly according to an embodiment of the present disclosure. FIG. 2 is an internal perspective view of a rear sliding glass assembly according to an embodiment of the present disclosure. FIG. 3 is an exploded perspective view of a rear sliding glass assembly according to an embodiment of the present disclosure.

Referring to FIGS. 1 to 3, a rear sliding glass assembly 1 according to an embodiment of the present disclosure may be installed at the rear of a vehicle. The rear sliding glass assembly 1 may selectively connect the interior and the exterior of the vehicle. For example, the rear sliding glass assembly 1 may include an opening 11, and the internal and external spaces of the vehicle may be connected or separated by operating the opening and closing of the opening 11.

The rear sliding glass assembly 1 may include, for example, a fixed glass module 10 and a sliding glass module 20.

The fixed glass module 10 may be fixed to the rear of the vehicle. The fixed glass module 10 may include a transparent material. The fixed glass module 10 may be connected to the rear of the vehicle through a separate frame or bracket. A sealing member (not shown) for water-tightness may be provided on the edge of the fixed glass module 10. The opening 11 may be provided on the inside of the fixed glass module 10. The opening 11 may be opened and closed by the sliding glass module 20.

The fixed glass module 10 may include the sliding glass module 20. The sliding glass module 20 may open and close the opening 11 of the fixed glass module 10. For example, the sliding glass module 20 may include a sliding glass portion 200 that may slide, and the opening 11 of the fixed glass module 10 may be opened and closed as the sliding glass portion 200 slides.

Figure 4:
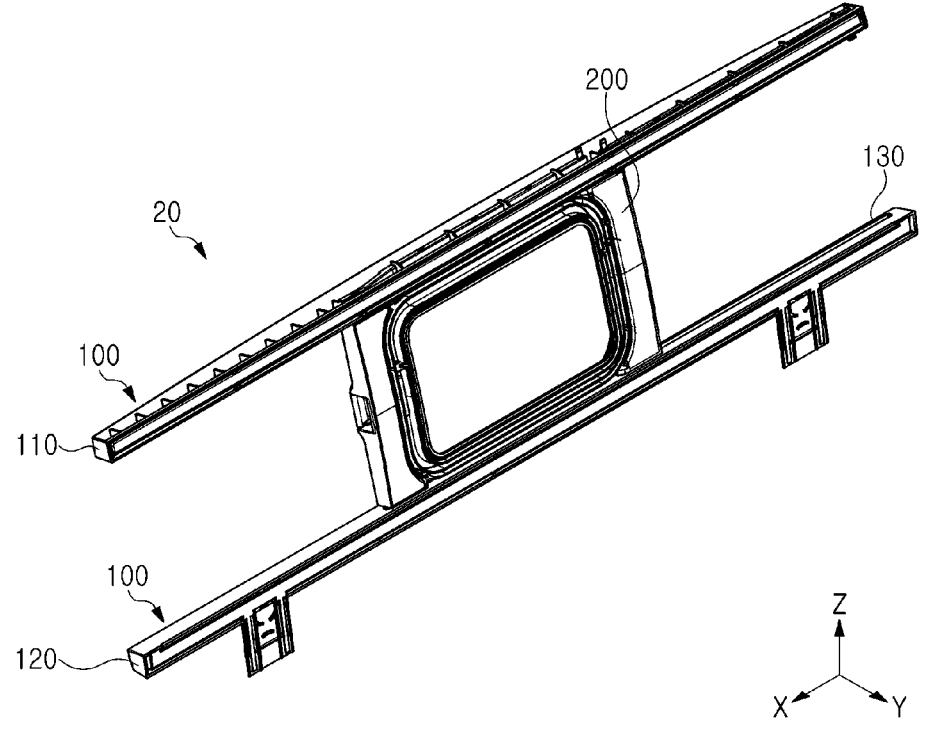
FIG. 4 is an external perspective view of a sliding glass module according to an embodiment of the present disclosure.
Figure 5:
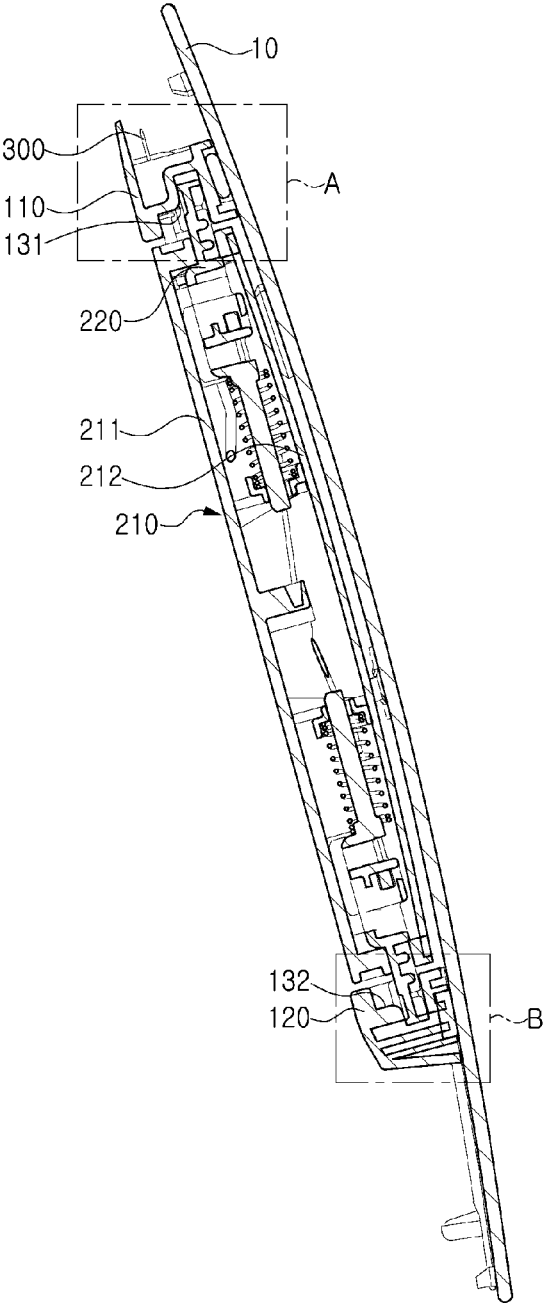
FIG. 5 is a cross-sectional view taken along line I-I' of FIG. 2.
Figure 6:
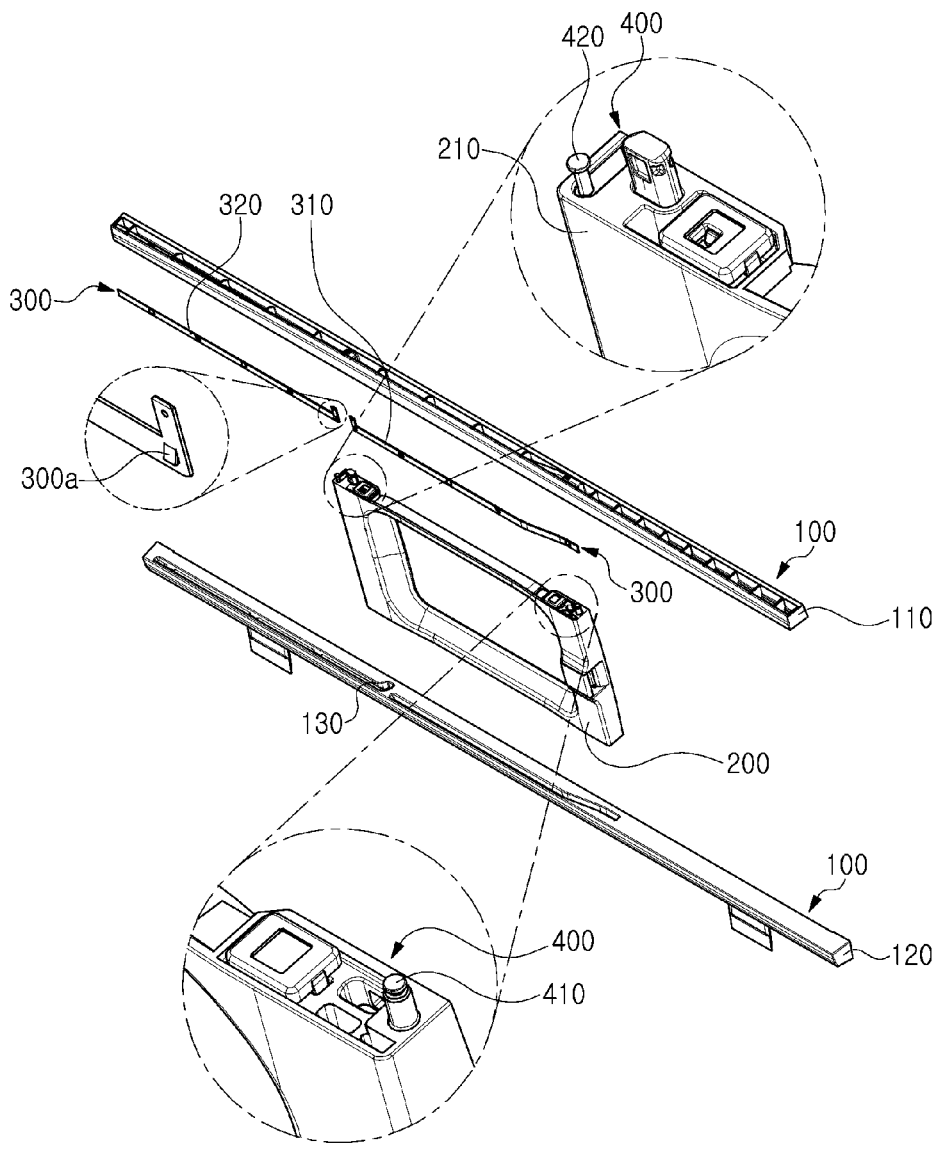
FIG. 6 is an exploded perspective view of a sliding glass module according to an embodiment of the present disclosure.

FIG. 4 is a perspective view of the sliding glass module according to an embodiment of the present disclosure. FIG. 5 is a cross-sectional view taken along line I-I'. FIG. 6 is an exploded perspective view of a sliding glass module according to an embodiment of the present disclosure.

Referring to FIGS. 4 to 6, the sliding glass module 20 may include, for example, a rail 100, the sliding glass portion 200, a busbar 300, and a pin module 400.

The rail 100 may be connected to the fixed glass module 10. The rail 100 may guide a movement path of the sliding glass portion 200. The rail 100 may include, for example, an upper rail 110 provided on an upper portion of the fixed glass module 10, that is, above the sliding frame 210, and a lower rail 120 provided on a lower portion of the fixed glass module 10, that is, below the sliding frame 210. The rail 100 may include a guide groove 130. The sliding glass portion 200 may slide along the guide groove 130. The guide groove 130 may include an upper guide groove 131 (also shown in FIG. 7) provided on the upper rail 110 and a lower guide groove 132 (also shown in FIG. 11) provided on the lower rail 120. A portion of the sliding glass portion 200 can be inserted into the upper guide groove 131 and the lower guide groove 132.

At least a portion of upper and lower ends of the sliding glass portion 200 may be inserted into the upper rail 110 and the lower rail 120, respectively. For example, at least a portion of the upper and lower ends of the sliding glass portion 200 may be inserted into the guide groove 130 of the rail 100.

The sliding glass portion 200 may slide along the rail 100 while the upper and lower portions are inserted into the upper rail 110 and the lower rail 120, respectively. The opening 11 of the fixed glass module 10 may be provided between the upper rail 110 and the lower rail 120. Therefore, the opening 11 may be opened and closed as the sliding glass portion 200 slides. A sliding glass 230 of the sliding glass portion 200 may include a heating wire 231 (shown in FIG. 13). The heating wire 231 may be provided to remove frost, etc., from the sliding glass 230. The heating wire 231 may be connected to the busbar 300 and supplied with power.

The busbar 300 may be provided inside the rail 100. The busbar 300 may be connected to an external power source (not shown) and may transmit power supplied from the external power source to the heating wire 231. The busbar 300 may include, for example, a first busbar 310 connected to one of a negative or positive terminal of the external power source and a second busbar 320 connected to the other of the negative or positive terminal of the external power source. The first busbar 310 and the second busbar 320 may be provided to be spaced apart in a length direction (X-axis in FIG. 4) inside the rail 100. By providing the first busbar 310 and the second busbar 320 apart from each other, the possibility of a power supply failure due to an electrical short-circuit may be reduced. The first busbar 310 and the second busbar 320 may be provided inside the upper rail 110. By providing the first busbar 310 and the second busbar 320 on the upper rail 110, the possibility of a power supply failure that may occur due to water flowing into the lower rail 120 may be reduced.

The busbar 300 may be provided with at least one cut-out protrusion 300a. The cut-out protrusion 300a may be formed as at least a portion of the busbar 300 is cut and bent in a width direction (Y-axis in FIG. 4). The cut-out protrusion 300a may be secured to a step 131c (shown in FIG. 10) of a busbar insertion slit 131a to prevent the busbar 300 from escaping from the busbar insertion slit 131a.

The busbar 300 may be in contact with the pin module 400 electrically connected to the heating wire 231 inside the upper rail 110. Power supplied through the busbar 300 may be transmitted to the heating wire 231 through the pin module 400. The pin module 400 may be in elastic contact with the busbar 300. The pin module 400 may maintain contact with the busbar 300 even when the sliding glass portion 200 moves. The external power source and the heating wire may be stably connected through the busbar 300.

Figure 7:
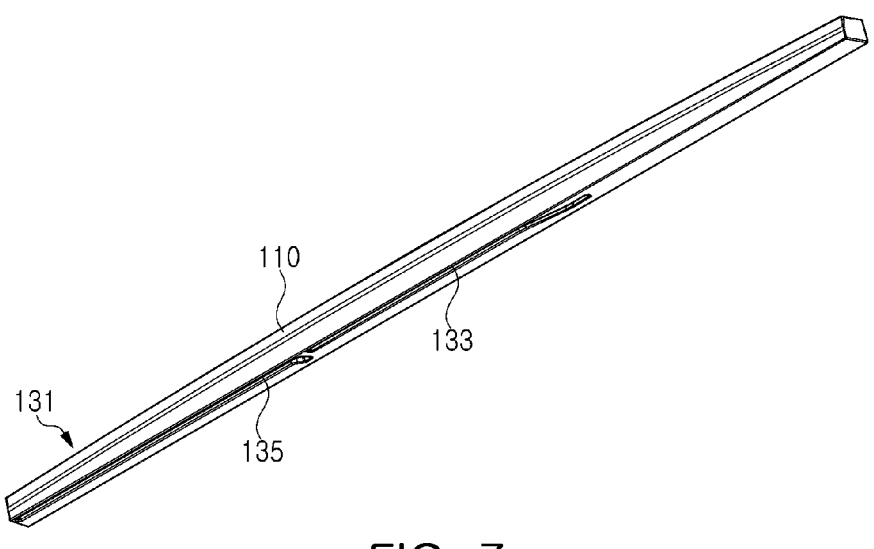
FIG. 7 is a bottom perspective view of an upper rail according to an embodiment of the present disclosure.
Figure 8:
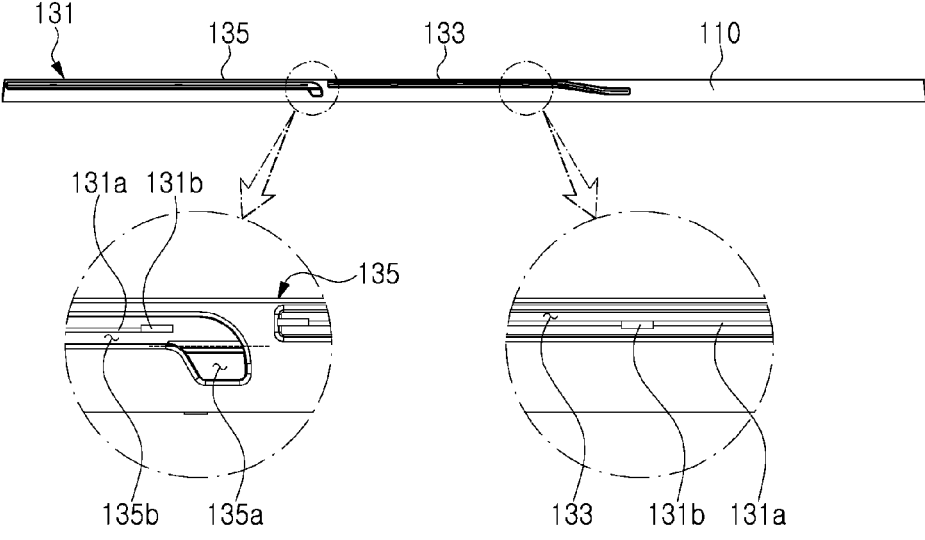
FIG. 8 is a bottom view of an upper rail according to an embodiment of the present disclosure.
Figure 9:
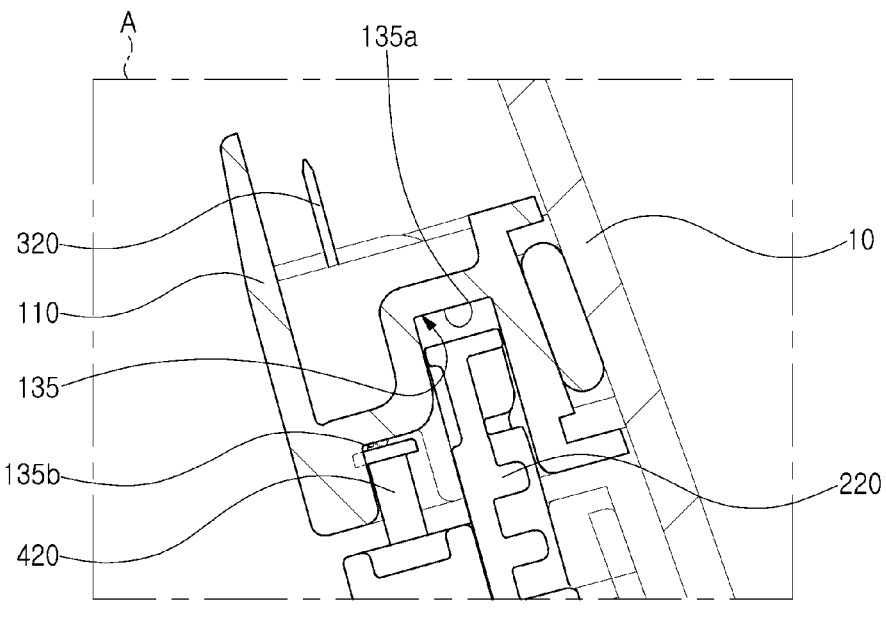
FIG. 9 is an enlarged view of portion A of FIG. 5.
Figure 10:
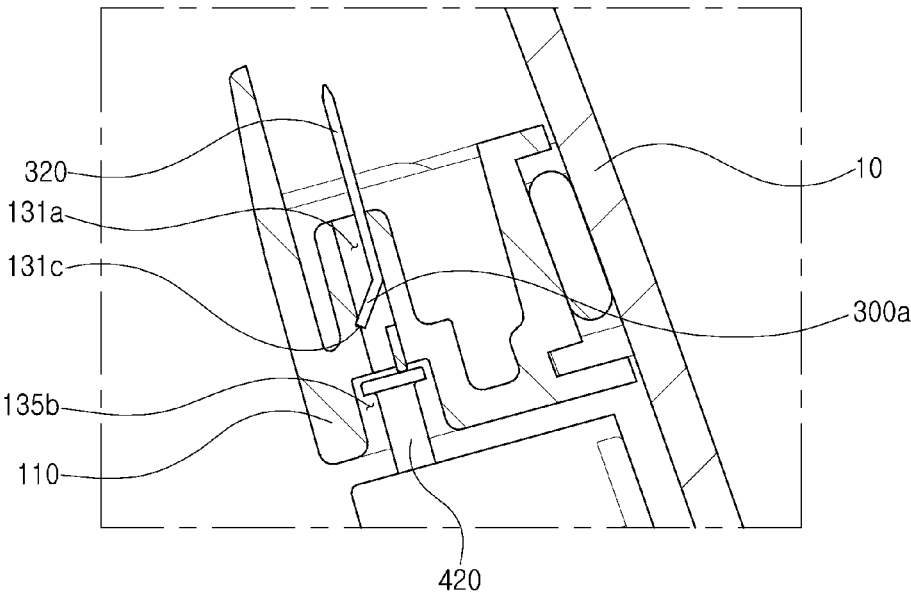
FIG. 10 is a partial cross-sectional view taken along line II-II' of FIG. 2.

FIG. 7 is a bottom perspective view of the upper rail according to an embodiment of the present disclosure. FIG. 8 is a bottom view of the upper rail according to an embodiment of the present disclosure. FIG. 9 is an enlarged view of portion A of FIG. 5. FIG. 10 is a partial cross-sectional view taken along line II-II' of FIG. 2.

Referring to FIGS. 7 to 10, the upper guide groove 131 may be provided in the upper rail 110. The upper guide groove 131 may be provided on the bottom surface of the upper rail 110. For example, the upper guide groove 131 may be formed as a portion of the bottom surface of the upper rail 110 is recessed inwardly by a predetermined depth. A busbar insertion slit 131a may be provided in the upper guide groove 131. The busbar 300 may be inserted into the busbar insertion slit 131a. The busbar 300 may be inserted into the busbar insertion slit 131a so that one end portion of the busbar 300 protrudes into the upper guide groove 131. For example, a lower end portion of the busbar 300 may protrude to a lower side of the busbar insertion slit 131a. The lower end portion of the busbar 300 may be disposed in the upper guide groove 131. The lower end portion of the busbar 300 protruding to the upper guide groove 131 may be in contact with the pin module 400.

The busbar insertion slit 131a may be provided on an upper inner surface of the upper guide groove 131. The busbar insertion slit 131a may extend in the length direction. The busbar insertion slit 131a may include a terminal through-hole 131b. The terminal through-hole 131b may be provided to pass through the upper rail 110. A portion of the busbar 300 may protrude to the outside of the upper rail 110 through the terminal through-hole 131b of the busbar insertion slit 131a and be connected to an external power source.

The upper guide groove 131 may include a first upper guide groove 133 provided on one longitudinal side of the upper rail 110 and a second upper guide groove 135 provided on the other longitudinal side of the upper rail 110. The busbar insertion slit 131a may be provided in each of the first upper guide groove 133 and the second upper guide groove 135. The first busbar 310 may be inserted into the busbar insertion slit 131a provided in the first upper guide groove 133. The second busbar 320 may be inserted into the busbar insertion slit 131a provided in the second upper guide groove 135.

At least one step 131c may be provided in the busbar insertion slit 131a. For example, a plurality of steps 131c may be provided spaced apart from each other in the length direction on the inner side of the busbar insertion slit 131a. The cut-out protrusion 300a of the busbar 300 may be seated on the step 131c. By seating the cut-out protrusion 300a of the busbar 300 on the step 131c, the busbar 300 may be prevented from being separated to a lower side of the busbar insertion slit 131a.

One side of the first pin module 410 may be inserted into the first upper guide groove 133. The first pin module 410 and the first busbar 310 may be in contact with each other inside the first upper guide groove 133. For example, a first pin member 412 of the first pin module 410 and a lower end portion of the first busbar 310 protruding to the first upper guide groove 133 may be in contact with each other inside the first upper guide groove 133. The first pin module 410 may move together when the sliding glass portion 200 moves. The first pin module 410 may move along the first upper guide groove 133. The contact state between the first pin module 410 and the first busbar 310 may be maintained while the first pin module 410 moves.

One side of the second pin module 420 may be inserted into the second upper guide groove 135. The second pin module 420 and the second busbar 320 may be in contact with each other inside the second upper guide groove 135. For example, the second pin member 422 of the second pin module 420 and the lower end portion of the second busbar 320 protruding to the second upper guide groove 135 may be in contact with each other inside the second upper guide groove 135. The second pin module 420 may move together when the sliding glass portion 200 moves. The second pin module 420 may move along the second upper guide groove 135. While the second pin module 420 moves, the contact state between the second pin module 420 and the second busbar 320 may be maintained.

The second upper guide groove 135 may include an upper fixed groove part 135a and an upper movable groove part 135b. The upper fixed groove part 135a may be formed to retract by a predetermined depth inwardly from the bottom surface of the upper rail 110. A recessed length of the upper fixed groove part 135a may be longer than a recessed length of the upper movable groove part 135b. The upper movable groove part 135b may be recessed inwardly from the bottom surface of the upper rail 110 so as to be connected to the upper fixed groove part 135a in a width direction of the upper rail 110. The upper movable groove part 135b may extend in the length direction of the upper rail 110. The upper fixed groove part 135a and the upper movable groove part 135b may be provided continuously to each other.

Figures 11, 12:
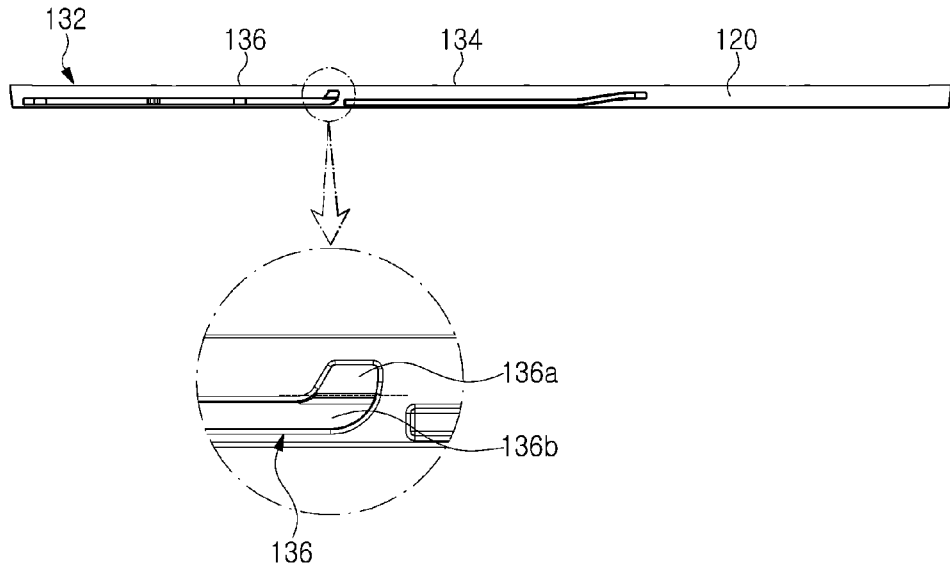
FIG. 11 is a plan view of a lower rail according to an embodiment of the present disclosure.
FIG. 12 is an enlarged view of portion B of FIG. 5.

FIG. 11 is a plan view of the lower rail according to an embodiment of the present disclosure. FIG. 12 is an enlarged view of portion B of FIG. 5.

Referring to FIGS. 11 and 12, the lower guide groove 132 may be provided on the lower rail 120. The lower guide groove 132 may be provided on an upper surface of the lower rail 120. For example, the lower guide groove 132 may be formed as a portion of the upper surface of the lower rail 120 is recessed inwardly by a predetermined depth. The lower guide groove 132 may include, for example, a first lower guide groove 134 provided on one side of the lower rail 120 in the length direction and a second lower guide groove 136 provided on the other side of the lower rail 120 in the length direction.

The first lower guide groove 134 may extend in the length direction from an upper surface of the lower rail 120. The first lower guide groove 134 may be provided in a shape corresponding to the first upper guide groove 133.

The second lower guide groove 136 may be provided on the upper surface of the lower rail 120 and spaced apart from the first lower guide groove 134 in the length direction. The second lower guide groove 136 may be provided in a shape corresponding to the second upper guide groove 135. The second lower guide groove 136 may include, for example, a lower fixed groove part 136a recessed inwardly from the upper surface of the lower rail 120 by a predetermined depth and a lower movable groove part 136b recessed inwardly from the upper surface of the lower rail 120 by a predetermined depth so as to be connected to the lower fixed groove part 136a in the width direction of the lower rail 120 and extending in the length direction of the lower rail 120. The lower fixed groove part 136a may be provided to be symmetrical with the upper fixed groove part 135a. The lower movable groove part 136b may be provided to be symmetrical with the upper movable groove part 135b. The lower guide groove 132 and the upper guide groove 131 may be provided to be symmetrical with each other in the groove shape, while only the configuration of the busbar insertion slit 131a is different.

Figure 13:
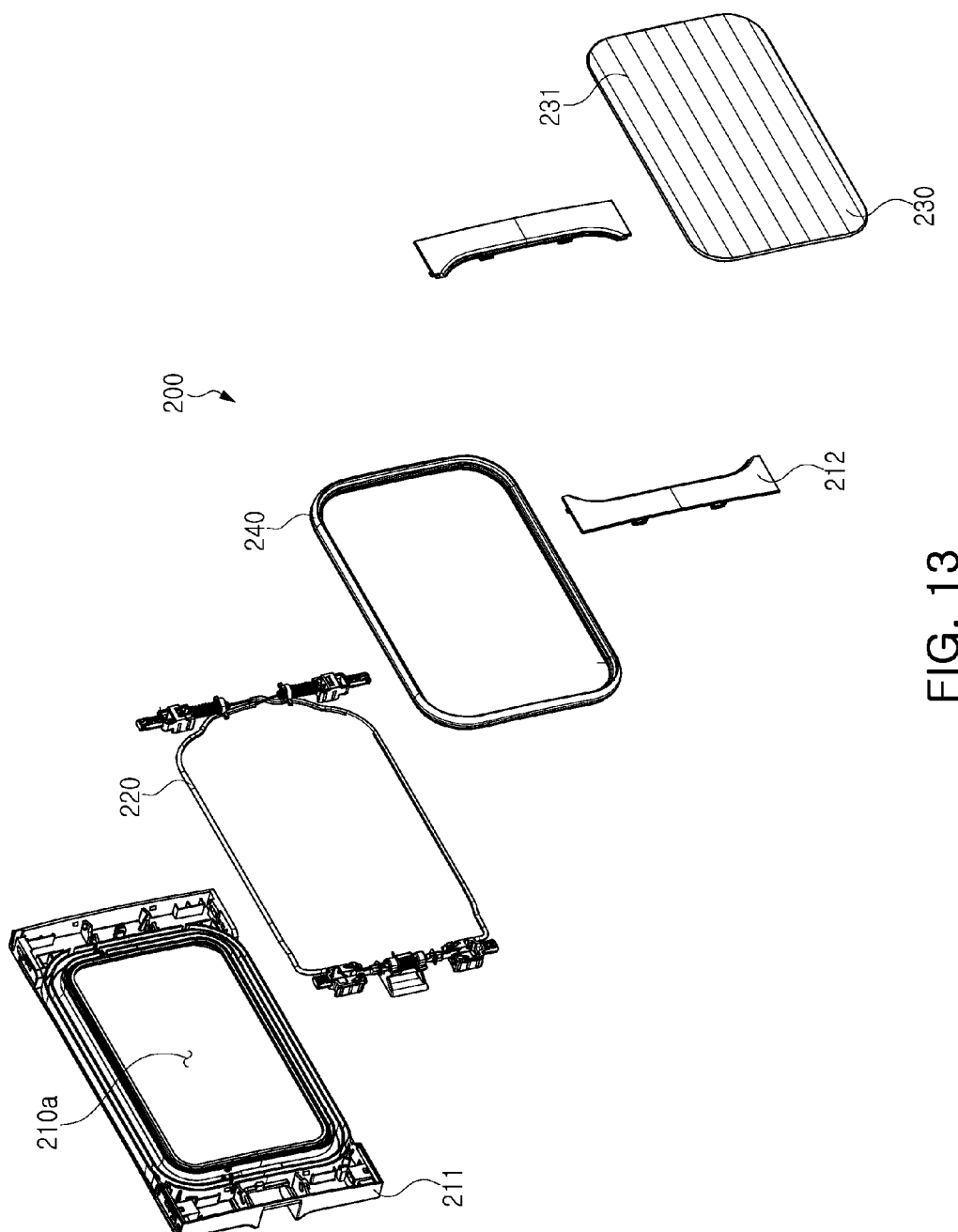
FIG. 13 is an exploded perspective view of a sliding glass portion according to an embodiment of the present disclosure.
Figure 14:
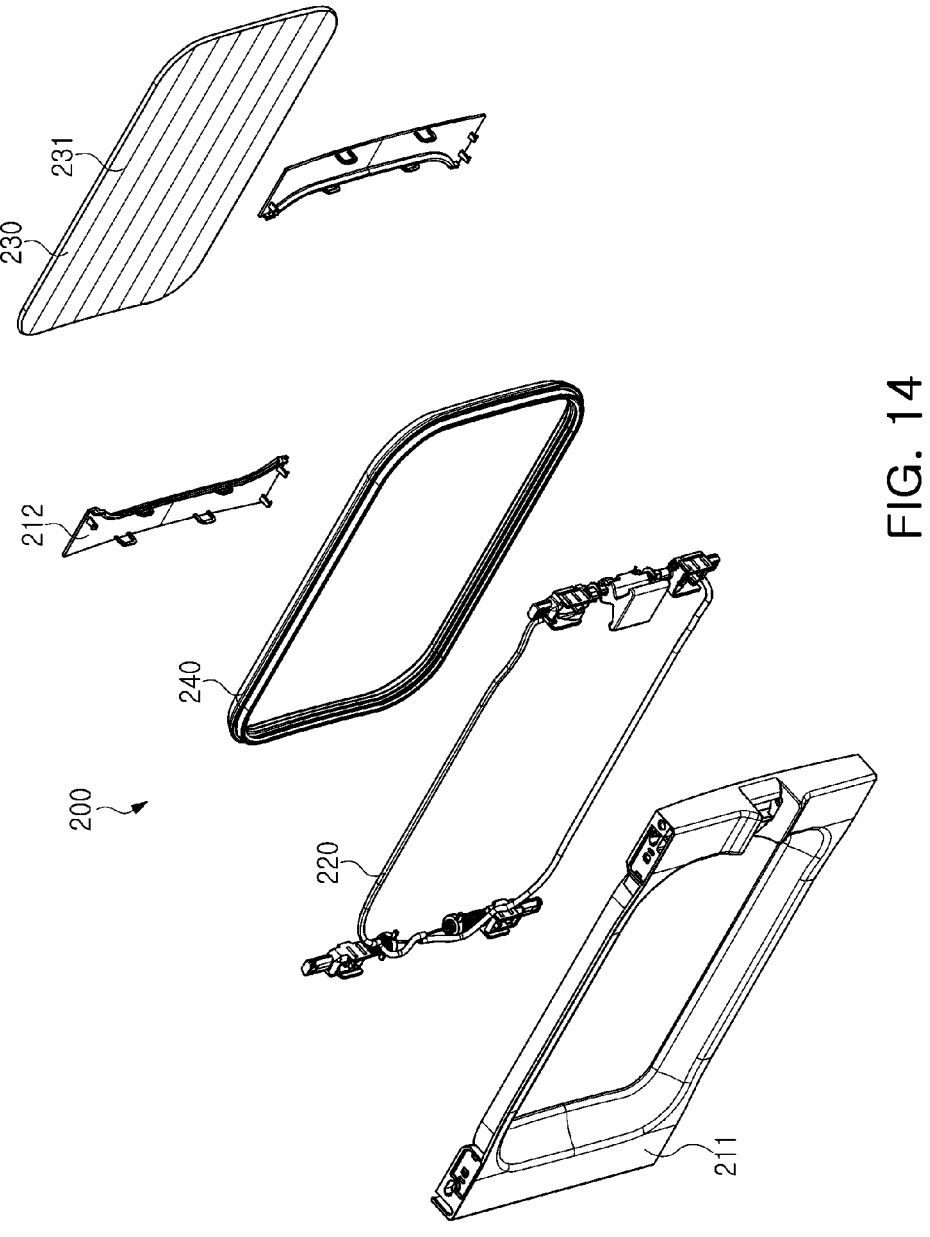
FIG. 14 is an exploded perspective view of a sliding glass portion viewed in a direction different from that of FIG. 13 according to an embodiment of the present disclosure.

FIG. 13 is an exploded perspective view of the sliding glass portion according to an embodiment of the present disclosure. FIG. 14 is an exploded perspective view of the sliding glass portion viewed in a direction different from that of FIG. 13, according to an embodiment of the present disclosure.

Referring to FIGS. 13 and 14, the sliding glass portion 200 may open and close the opening 11 of the fixed glass module 10 while sliding along the rail 100. The sliding glass portion 200 may include, for example, a sliding frame 210, a locking portion 220, a sliding glass 230, and a weather strip 240.

The sliding frame 210 may include a case 211 and a cover 212. The case 211 may include an opening 210a. Various components required for operation of the sliding glass module 20 may be accommodated inside the case 211. The cover 212 may be coupled to the case 211. The cover 212 may prevent components provided inside the case 211 from being exposed externally. When the case 211 and the cover 212 are coupled to each other, the sliding frame 210 may have an overall rectangular frame shape.

The sliding frame 210 may include the locking portion 220. The locking portion 220 may fix the sliding frame 210 to the rail or switch the sliding frame 210 into slidably movable state. For example, when a handle module 223 (shown in FIG. 15) of the locking portion 220 rotates in one direction, the sliding frame 210 may be switched to a slidably movable state. After the sliding frame 210 is switched to a slidably movable state by the locking portion 220, a user may move the sliding frame 210 by applying external force to the handle module 223.

The sliding glass 230 may be coupled to the sliding frame 210. The sliding glass 230 may be coupled to the sliding frame 210 to block the opening 210a of the sliding frame 210. The sliding glass 230 may be provided with the heating wire 231. The heating wire 231 may be provided to remove frost from the sliding glass 230. The heating wire 231 may be connected to the pin module 400 and supplied with power from the busbar 300.

The weather strip 240 may be provided for water-tightness or air-tightness between the sliding frame 210 and the fixed glass module 10. The weather strip 240 may be provided to wrap around the edge of the sliding glass 230. The weather strip may include, for example, silicone rubber, polyvinyl chloride (PVC), thermoplastic elastomer (TPE), ethylene propylene diene monomer (EPDM), etc. The weather strip 240 may be formed of various materials commonly used in the art to which the present disclosure pertains. The weather strip 240 may be compressed between the sliding frame 210 and the fixed glass module 10. The compressed state of the weather strip 240 may be maintained by the locking portion 220. When the locking portion 220 maintains the sliding frame 210 fixed to the rail 100, the weather strip 240 may be compressed. When the locking portion 220 switches the sliding frame 210 to a movable state, the weather strip 240 may push the sliding frame 210 in the width direction by a predetermined length so as to be released from the compressed state.

The sliding glass portion 200 may include a flush structure. In other words, an outer surface of the sliding glass 230 may be provided in a form that is smoothly integrated with an outer surface of the fixed glass module 10. Therefore, a step between the sliding glass portion 200 and the fixed glass module 10 may be minimized to improve the watertight performance and the appearance of the product.

Figure 15:
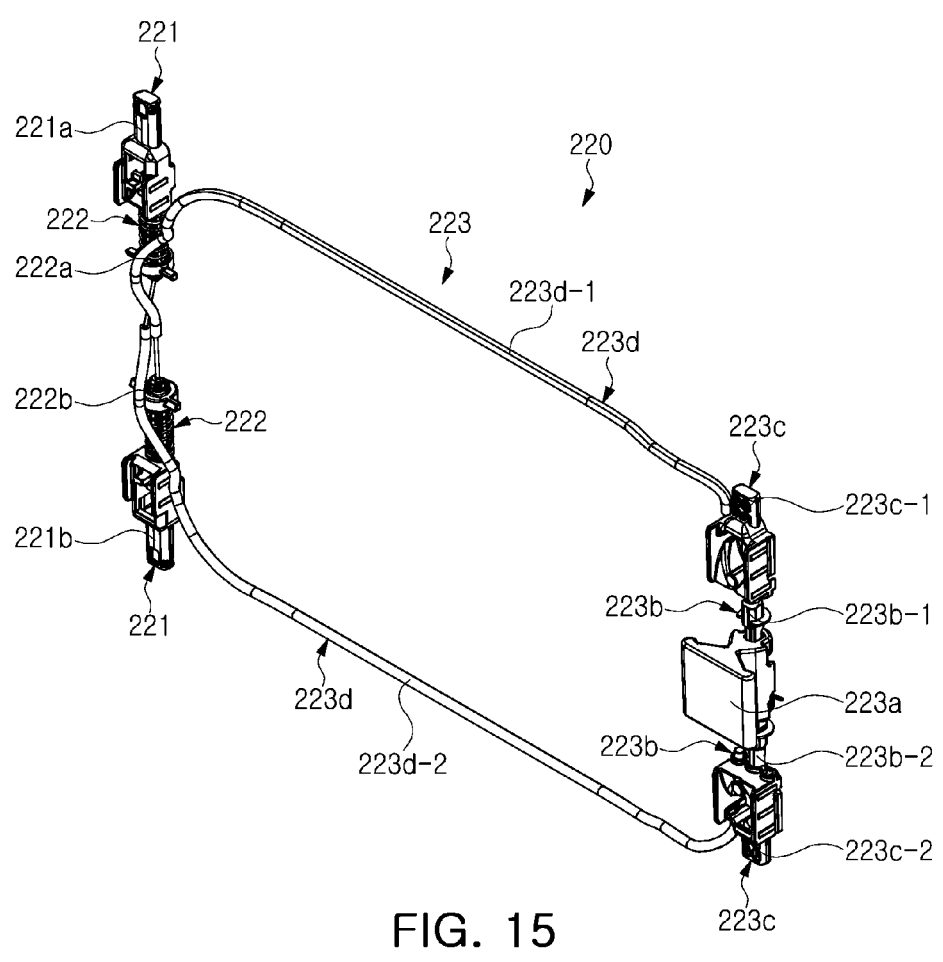
FIG. 15 is a perspective view of a locking portion according to an embodiment of the present disclosure.
Figure 16:
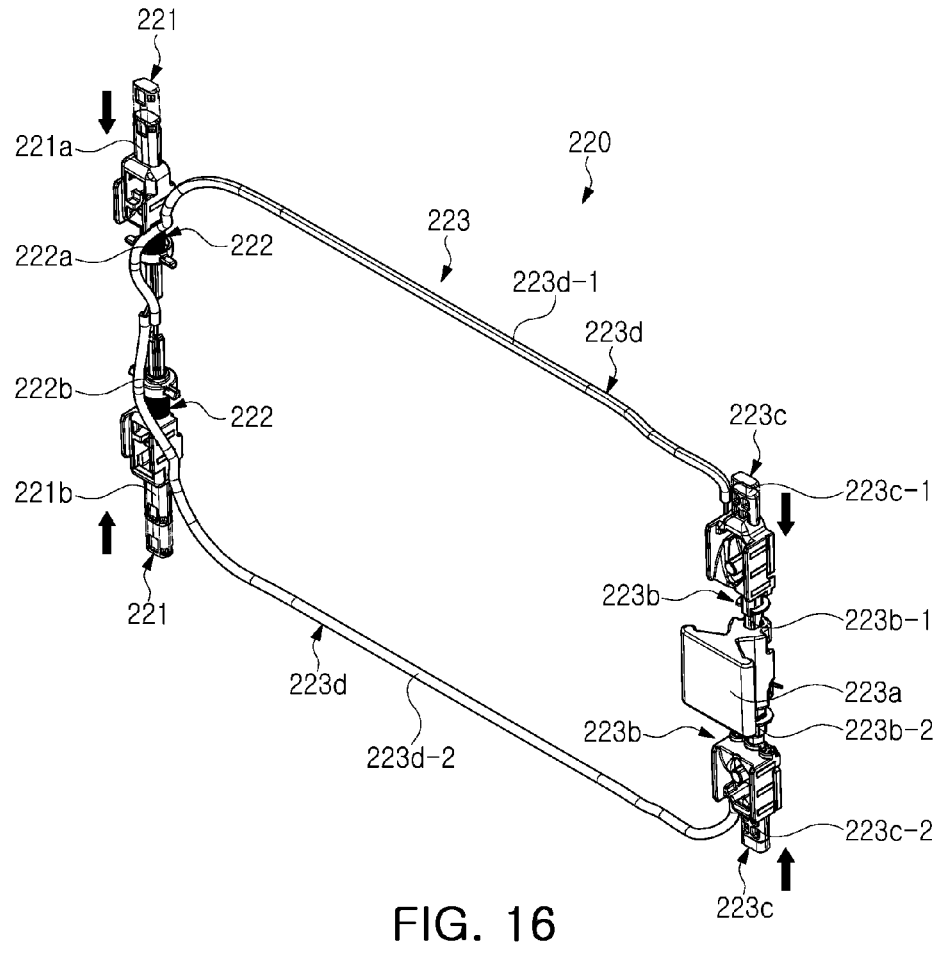
FIG. 16 is a perspective view illustrating a state in which a guide stopper is pulled to the inside of a sliding frame in a locking portion according to an embodiment of the present disclosure.
Figure 17:
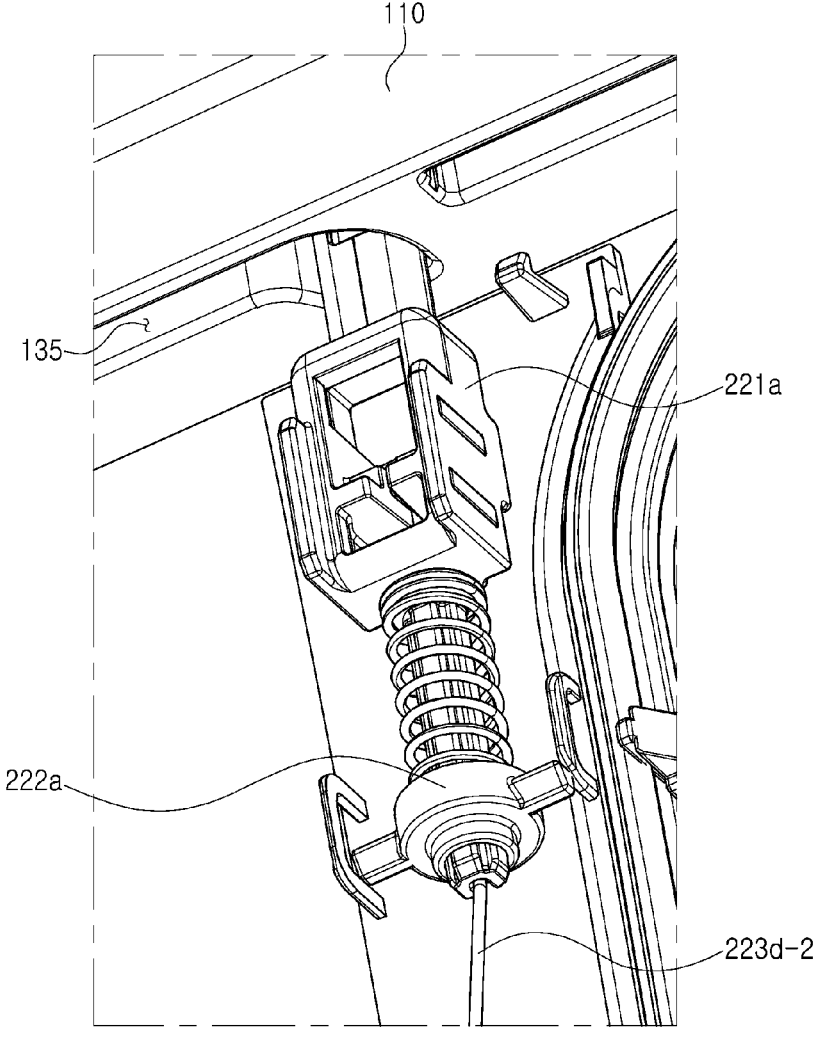
FIG. 17 is a perspective view illustrating a state in which a guide stopper is inserted into a guide groove of a rail.
Figure 18:
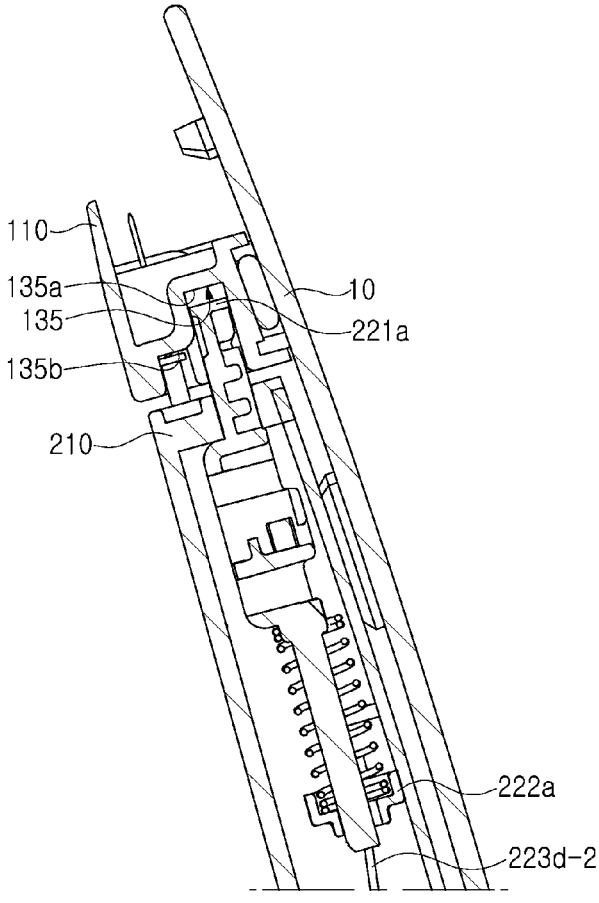
FIG. 18 is a cross-sectional view illustrating a state in which a sliding glass portion is fixed.
Figure 19:
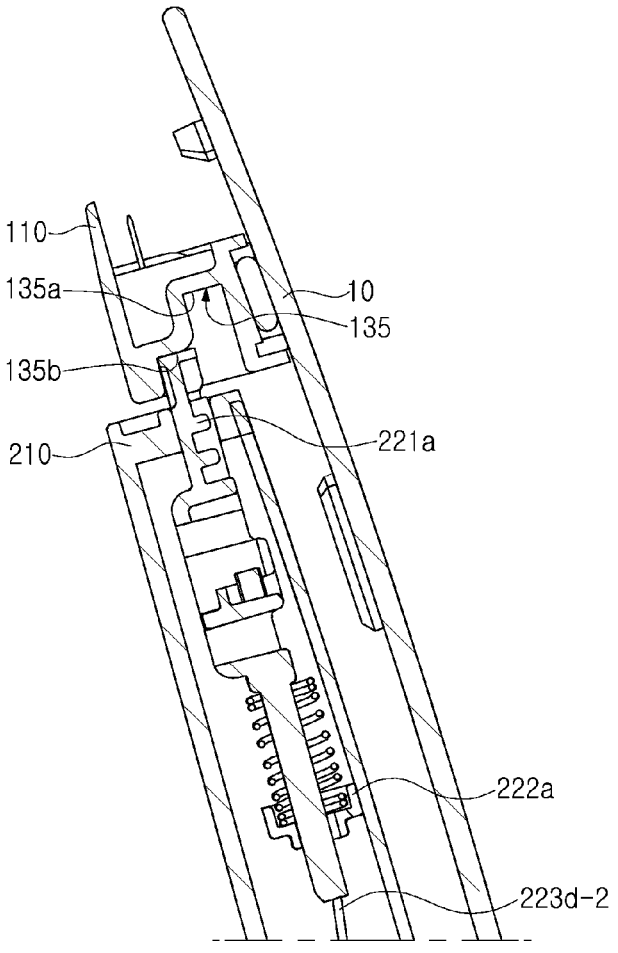
FIG. 19 is a cross-sectional view illustrating a state in which a sliding glass portion is movable.

FIG. 15 is a perspective view of a locking portion according to an embodiment of the present disclosure. FIG. 16 is a perspective view illustrating a state in which a guide stopper is pulled to the inside of a sliding frame in a locking portion according to an embodiment of the present disclosure. FIG. 17 is a perspective view illustrating a state in which a guide stopper is inserted into a guide groove of a rail. FIG. 18 is a cross-sectional view illustrating a state in which a sliding glass portion is fixed. FIG. 19 is a cross-sectional view illustrating a state in which a sliding glass portion is movable.

Referring to FIGS. 15 to 19, the locking portion 220 may be provided on the sliding frame 210. The locking portion 220 may fix the sliding frame 210 or switch the sliding frame 210 to a slidably movable state. The locking portion 220 may include, for example, a guide stopper 221, a guide stopper elastic support portion 222, and the handle module 223. One side of the guide stopper 221 may be exposed to the outside of the sliding frame 210. The guide stopper 221 may be inserted into the guide groove 130 formed in the rail 100. Depending on the position of the guide groove 130 in which the guide stopper 221 is disposed, the sliding frame 210 may be switched to a fixed state or a movable state.

The guide stopper 221 may include an upper guide stopper 221a and a lower guide stopper 221b. The upper guide stopper 221a may be provided above the sliding frame 210. One end portion of the upper guide stopper 221a may be exposed to an upper side of the sliding frame 210. The upper guide stopper 221a may be inserted into the upper guide groove 131. For example, one end portion of the upper guide stopper 221a exposed to the upper side of the sliding frame 210 may be inserted into the upper guide groove 131. The lower guide stopper 221b may be provided below the sliding frame 210. One end portion of the lower guide stopper 221b may be exposed to a lower side of the sliding frame 210. The lower guide stopper 221b may be inserted into the lower guide groove 132. For example, one end portion of the lower guide stopper 221b exposed to the lower side of the sliding frame 210 may be inserted into the lower guide groove 132.

Depending on the positions of the upper guide stopper 221a and the lower guide stopper 221b, the sliding frame 210 may be switched to a fixed state or a movable state. For example, when the upper guide stopper 221a is disposed on the upper fixed groove part 135a and the lower guide stopper 221b is disposed on the lower fixed groove part 136a, the sliding frame 210 may be in a fixed state. When the upper guide stopper 221a is disposed on the upper movable groove part 135b and the lower guide stopper 221b is disposed on the lower movable groove part 136b, the sliding frame 210 may be in a movable state.

The guide stopper elastic support portion 222 may apply elastic force to the guide stopper 221. For example, the guide stopper elastic support portion 222 may apply elastic force in a direction in which the rail 100 is provided to the guide stopper 221.

The guide stopper elastic support portion 222 may include, for example, an upper guide stopper elastic support portion 222a applying elastic force to the upper guide stopper 221a and a lower guide stopper elastic support portion 222b applying elastic force to the lower guide stopper 221b.

The upper guide stopper elastic support portion 222a may apply elastic force to the upper guide stopper 221a in an upward direction. The lower guide stopper elastic support portion 222b may apply elastic force to the lower guide stopper 221b in a downward direction.

The handle module 223 may pull the guide stopper 221 inwardly of the sliding frame 210 by a predetermined length. The handle module 223 may include, for example, a knob 223a, a timing lever 223b, a timing slider 223c, and a connecting wire 223d.

The knob 223a may be rotatably connected to the sliding frame 210. At least a portion of the knob 223a may be exposed to the outside of the sliding frame 210. The user may grip and rotate the knob 223a.

The timing lever 223b may be retractably connected to the knob 223a. The timing lever 223b may slide inwardly or outwardly of the knob 223a depending on a rotational direction of the knob 223a. For example, when the knob 223a rotates in one direction, the timing lever 223b may slide to be drawn inwardly into the knob 223a. When the knob 223a rotates in the other direction, the timing lever 223b may slide outwardly from the knob 223a. The timing lever 223b may include, for example, an upper timing lever 223b-1 connected to an upper portion of the knob 223a and a lower timing lever 223b-2 connected to a lower portion of the knob 223a. When the knob 223a rotates in one direction, the upper timing lever 223b-1 may slide downwardly, and the lower timing lever 223b-2 may slide upwardly. When the knob 223a rotates in the other direction, the upper timing lever 223b-1 may slide upwardly, and the lower timing lever 233b-2 may slide downwardly.

The timing slider 223c may be connected to the timing lever 223b and may move in conjunction with the movement of the timing lever 223b. The timing slider 223c may include an upper timing slider 223c-1 connected to the upper timing lever 223b-1 and a lower timing slider 223c-2 connected to the lower timing lever 223b-2.

The connecting wire 223d may connect the timing slider 223c to the guide stopper 221. The connecting wire 223d may pull the guide stopper 221 toward the inside of the sliding frame 210 by a predetermined length when the timing slider 223c moves toward the inside of the knob 223a. The connecting wire 223d may include an upper connecting wire 223d-1 connected to the upper timing slider 223c-1 and a lower connecting wire 223d-2 connected to the lower timing slider 223c-2. The upper connecting wire 223d-1 may be connected to one of the upper guide stopper 221a or the lower guide stopper 221b. The lower connecting wire 223d-2 may be connected to the other of the upper guide stopper 221a or the lower guide stopper 221b.

When the upper guide stopper 221a is disposed on the upper fixed groove part 135a and the lower guide stopper 221b is disposed on the lower fixed groove part 136a, the sliding frame 210 may be in a fixed state. When the handle module 223 pulls the upper guide stopper 221a and the lower guide stopper 221b toward the inside of the sliding frame 210 in the fixed state of the sliding frame 210, the sliding frame 210 may move in the width direction by repulsive force of the weather strip 240. By the movement of the sliding frame 210, the upper guide stopper 221a may move to the upper movable groove part 135b, and the lower guide stopper 221b may move to the lower movable groove part 136b. A length by which the handle module 223 pulls the upper guide stopper 221a to the inside of the sliding frame 210 may be greater than or equal to a difference in length between the upper fixed groove part 135a and the upper movable groove part 135b recessed from the bottom surface of the upper rail 110. The length by which the handle module 223 pulls the lower guide stopper 221b to the inside of the sliding frame 210 may be greater than or equal to the difference in length between the lower fixed groove part 136a and the lower movable groove part 136b recessed from the upper surface of the lower rail 120.

By the operation of the handle module 223, the upper guide stopper 221a may move from the upper fixed groove part 135a to the upper movable groove part 135b, and the lower guide stopper 221b may move from the lower fixed groove part 136a to the lower movable groove part 136b.

Figure 20:
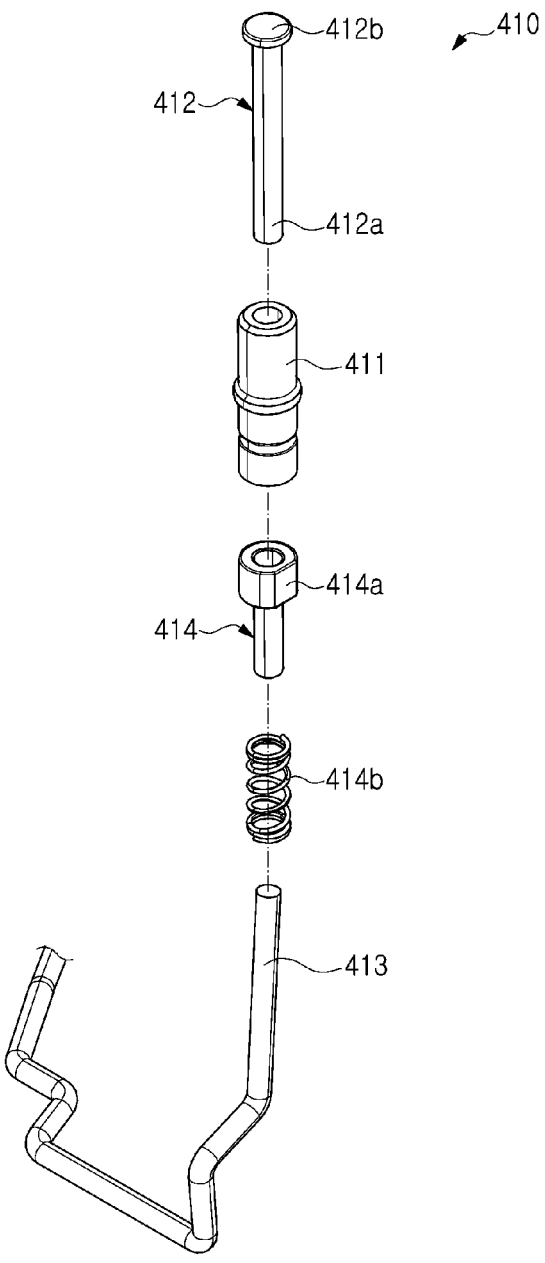
FIG. 20 is an exploded perspective view of a first pin module according to an embodiment of the present disclosure.
Figure 21:
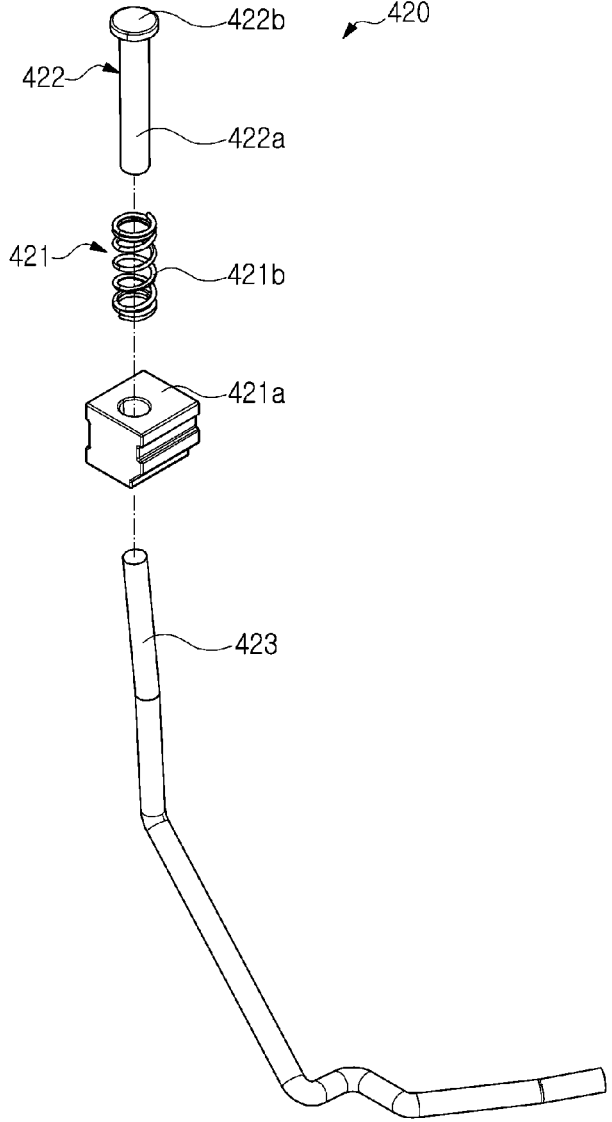
FIG. 21 is an exploded perspective view of a second pin module according to an embodiment of the present disclosure.
Figure 22:
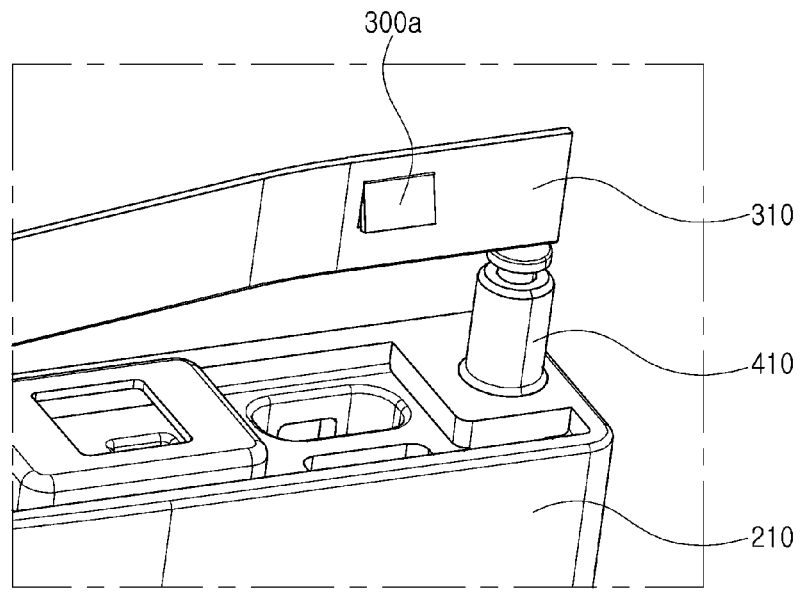
FIG. 22 is a partial perspective view illustrating a state in which the first pin module is in contact with a busbar.
Figure 23:
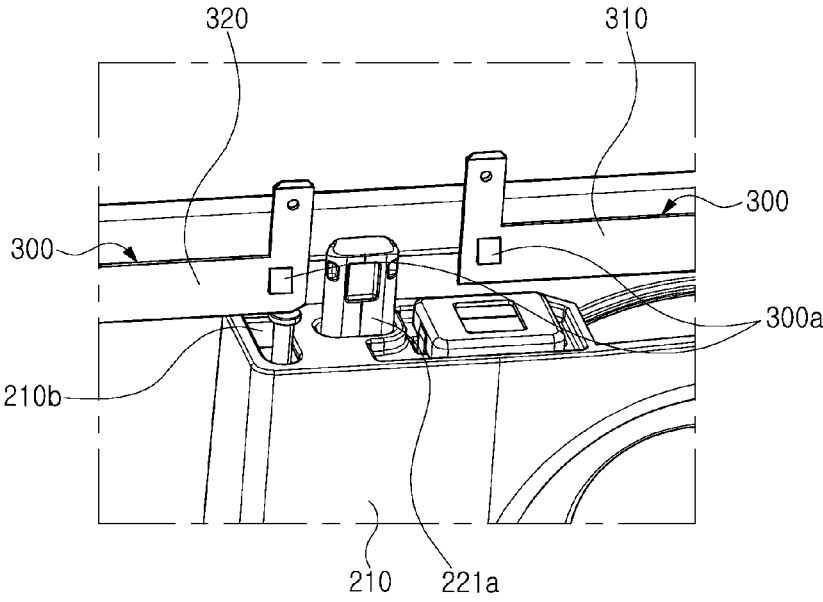
FIG. 23 is a partial perspective view illustrating a state in which the second pin module is in contact with a busbar while the sliding glass portion is fixed.
Figure 24:
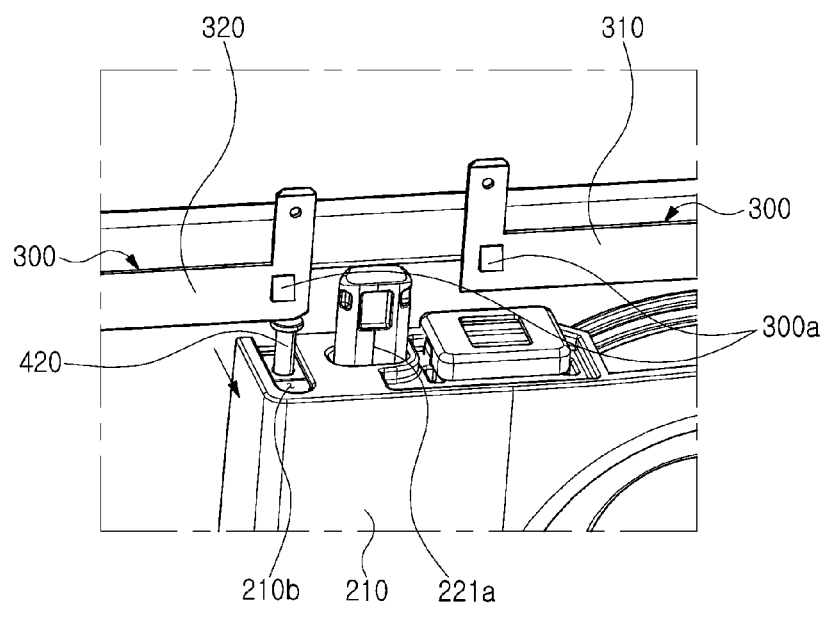
FIG. 24 is a partial perspective view illustrating a state in which the second pin module is in contact with a busbar while the sliding glass portion is movable.

FIG. 20 is an exploded perspective view of the first pin module according to an embodiment of the present disclosure. FIG. 21 is an exploded perspective view of a second pin module according to an embodiment of the present disclosure. FIG. 22 is a partial perspective view illustrating a state in which the first pin module is in contact with the busbar. FIG. 23 is a partial perspective view illustrating a state in which the second pin module is in contact with the busbar while the sliding glass portion is fixed. FIG. 24 is a partial perspective view illustrating a state in which the second pin module is in contact with the busbar while the sliding glass portion is movable.

Referring to FIGS. 20 to 24, the pin module 400 may be provided in the sliding glass portion 200 and may electrically connect the busbar 300 to the heating wire 231. The pin module 400 may include, for example, the first pin module 410 and the second pin module 420.

The first pin module 410 may be provided on one side of the sliding glass portion 200 in the length direction. The first pin module 410 may electrically connect the first busbar 310 to the heating wire 231. The first pin module 410 may include, for example, a sleeve 411, a first pin member 412, a first heating wire 413, and a first elastic support portion 414.

The sleeve 411 may be provided in the sliding glass portion 200. For example, the sleeve 411 may be provided on one longitudinal upper side of the sliding frame 210. The sleeve 411 may be fixed in position on the sliding frame 210. The first pin member 412 may be slidably inserted into the sleeve 411. The sleeve 411 may support the first pin member 412 so as to be slidably moved and may limit a slidably moving distance of the first pin member 412. For example, the first pin member 412 may move downwardly until it contacts the sleeve 411. The first pin member 412 may contact the first busbar 310. The first pin member 412 may maintain a contact state with the first busbar 310 even when the sliding glass portion 200 moves. The first pin member 412 and the first busbar 310 may be in contact with each other inside the first upper guide groove 133. A lower end portion of the first busbar 310 may be exposed to the first upper guide groove 133 in the length direction of the first upper guide groove 133. The first pin member 412 may move along the first upper guide groove 133 when the sliding glass portion 200 moves and may be in contact with the first busbar 310. The first pin member 412 may include, for example, a first body part 412a having both end portions exposed to the outside of the sleeve 411 through the sleeve 411 and a first head part 412*b* provided at one end of the first body part 412*a* and contacting the first busbar 310.

The first heating wire 413 may connect the first pin member 412 to the heating wire 231. The first heating wire 413 may connect, for example, the other end of the first body part 412*a* of the first pin member 412 to the heating wire 231. External power may be supplied to the heating wire 231 through the first busbar 310, the first pin member 412, and the first heating wire 413.

The first elastic support portion 414 may support the first pin member 412. For example, the first elastic support portion 414 may support the other end of the first body part 412*a*. The first elastic support portion 414 may apply elastic force to the first pin member 412. For example, the first elastic support portion 414 may apply elastic force in the direction in which the first busbar 310 is provided to the first pin member 412. Because the first elastic support portion 414 can continuously apply elastic force to the first pin member 412, even when the first pin member 412 moves along the first upper guide groove 133, the contact state between the first pin member 412 and the first busbar 310 may be maintained. The first elastic support portion 414 may include a first holder 414*a* supporting one side of the first pin member 412 not in contact with the first busbar 310 and a first elastic member 414*b* connected to the first holder 414*a* and applying elastic force to the first holder 414*a*.

The second pin module 420 may be provided on the other side of the sliding glass portion 200 in the length direction. The second pin module 420 may electrically connect the second busbar 320 to the heating wire 231. The second pin module 420 may include, for example, a second elastic support portion 421, a second pin member 422, and a second heating wire 423. The second elastic support portion 421 may be connected to the sliding glass portion 200. The second elastic support portion 421 may include a second holder 421*a* and a second elastic member 421*b*. The second holder 421*a* may be slidably connected to the sliding glass portion 200. An interference prevention groove 210*b* may be provided above the other side of the sliding frame 210 in the length direction. The interference prevention groove 210*a* may be formed to extend in the width direction of the sliding frame 210. The second holder 421*a* may be connected to the sliding frame 210 so as to be slidable along the interference prevention groove 210*b*. The second elastic member 421*b* may have one end in contact with the second pin member 422 and the other end in contact with one surface of the second holder 421*a* to apply elastic force to the second pin member 422. For example, the second elastic member 421*b* may apply elastic force in the direction in which the second busbar 320 is provided to the second pin member 422.

The second pin member 422 may be slidably coupled to the second elastic support portion 421. For example, the second pin member 422 may be slidably inserted into the second holder 421*a*. The second pin member 422 may include a second body part 422*a* inserted into the second holder 421*a* and a second head part 422*b* provided at one end of the second body part 422*a* and contacting the second busbar 320. The second head part 422*b* may contact the second busbar 320 inside the second upper guide groove 135. The second elastic member 421*b* may contact a bottom surface of the second head part 422*b* and an upper surface of the second holder 421*a* on both sides, and thereby can apply elastic force to the second head part 422*b*. The contact state between the second pin member 422 and the second busbar 320 may be maintained when the sliding glass portion 200 moves by the second elastic member 421*b*. When the locking portion 220 pulls the guide stopper 221 inwardly of the sliding frame 210 to change the sliding frame 210 to a movable state, the sliding frame 210 can move by a predetermined distance in the width direction by repulsive force of the weather strip 240. One longitudinal side of the sliding frame 210 equipped with the first pin module 410 may become a rotational axis, and the other longitudinal side equipped with the second pin module 420 may move in the width direction. When the other longitudinal side of the sliding frame 210 moves in the width direction, the second holder 421*a* may slide in the sliding frame 210 and maintain an initial position. The second pin member 422 may also maintain the initial position by the interference prevention groove 210*b*. Therefore, the contact state between the second pin member 422 and the second busbar 320 may be maintained.

The rear sliding glass assembly 1 according to an embodiment of the present disclosure described above may have the busbar 300 inside the rail 100, and thereby can minimize a problem of damage due to external exposure of the wire harness. By applying elastic force to the pin module 400, the contact state with the busbar 300 may be stably maintained even while the sliding glass portion 200 moves, according to an embodiment of the present disclosure.

The sliding glass module and the rear sliding glass assembly according to an embodiment of the present disclosure can have an advantage of stably connecting the wiring harness to the heating wire.

The sliding glass module and the rear sliding glass assembly according to an embodiment of the present disclosure can have an advantage of improving the water-tightness performance.

The sliding glass module and the rear sliding glass assembly according to an embodiment of the present disclosure can have an advantage of improving the appearance of the product.

A number of embodiments have been disclosed herein. It can be understood that various features of the different embodiments can be combined. While example embodiments have been shown and described above, it can be apparent to those skilled in the art that modifications and variations can be made without departing from the scopes of the present disclosure as defined by the appended claims.

What is claimed is:

1. A sliding glass system comprising:
a rail;
a sliding glass portion including a heating wire, wherein the sliding glass portion is slidably connected to the rail;
an electrically conductive busbar on the rail; and
a pin module electrically connecting the busbar to the heating wire,
wherein the pin module is configured to maintain contact with the busbar when the sliding glass portion is moved,
wherein the sliding glass portion comprises:
a sliding frame having an opening and an interference prevention groove extending in a width direction of the sliding frame,
a locking portion disposed on the sliding frame and selectively fixing the sliding frame to the rail or switching the sliding frame to a slidably movable state, and
a sliding glass coupled to a first sliding-frame surface of the sliding frame, wherein the sliding glass is configured to cover the opening of the sliding frame, and wherein the sliding glass includes the heating wire, and wherein the pin module is configured to be slidable along the interference prevention groove.

2. The system of claim 1, wherein the busbar comprises:

a first busbar inserted at least partially inside the rail and configured to be electrically connected to one of a negative terminal or a positive terminal of an external power source; and a second busbar inserted at least partially inside the rail and configured to be electrically connected to another of the negative terminal or the positive terminal of the external power source.

3. The system of claim 2, wherein the pin module comprises:

a first pin module on a first side of the sliding glass portion in a length direction and contacting the first busbar; and a second pin module on a second side of the sliding glass portion in the length direction and contacting the second busbar.

4. The system of claim 3, wherein the first pin module comprises:

a sleeve coupled to the sliding glass portion;

a first pin member slidably inserted into the sleeve and contacting the first busbar;

a first heating wire electrically connecting the first pin member to the heating wire; and a first elastic support portion configured to apply an elastic force to bias the first pin member toward the first busbar.

5. The system of claim 4, wherein the first pin member comprises:

a first body part extending through the sleeve and having both end portions thereof exposed to an outside of the sleeve; and a first head part at a first end of the end portions of the first body part and contacting the first busbar.

6. The system of claim 5, wherein the first elastic support portion supports a second end of the end portions of the first body part.

7. The system of claim 4, wherein the first elastic support portion comprises:

a first holder supporting a first-pin-member portion of the first pin member not in contact with the first busbar; and a first elastic member connected to the first holder and configured to apply the elastic force to the first holder.

8. The system of claim 3, wherein the second pin module comprises:

a second elastic support portion connected to the sliding glass portion;

a second pin member slidably inserted into and connected to the second elastic support portion and having a first end in contact with the second busbar; and a second heating wire electrically connecting a second end of the second pin member to the heating wire, wherein the second elastic support portion is configured to apply an elastic force to bias the second pin member toward the second busbar.

9. The system of claim 8, wherein the second elastic support portion comprises:

a second holder slidably coupled to the sliding glass portion and into which the second pin member is slidably inserted; and a second elastic member having a first second-elastic-member portion in contact with the second pin member and a second second-elastic-member portion in contact with a surface of the second holder and configured to apply the elastic force to the second pin member.

10. A sliding glass system comprising:

a rail;

a sliding glass portion including a heating wire, wherein the sliding glass portion is slidably connected to the rail;

an electrically conductive busbar on the rail; and a pin module electrically connecting the busbar to the heating wire, wherein the pin module is configured to maintain contact with the busbar when the sliding glass portion is moved, wherein the sliding glass portion comprises:

a sliding frame having an opening and an interference prevention groove extending in a width direction of the sliding frame;

a locking portion disposed on the sliding frame and selectively fixing the sliding frame to the rail or switching the sliding frame to a slidably movable state;

a sliding glass coupled to a first sliding-frame surface of the sliding frame, wherein the sliding glass is configured to cover the opening of the sliding frame and wherein the sliding glass includes the heating wire; and a weather strip disposed on the sliding frame and wrapped around an edge of the sliding glass, wherein the pin module is configured to be slidable along the interference prevention groove.

11. The system of claim 10, wherein the locking portion comprises:

a guide stopper having a first guide-stopper side exposed to an outside of the sliding frame and inserted into a guide groove formed in the rail;

a guide stopper elastic support portion configured to apply an elastic force to the guide stopper; and a handle module configured to pull the guide stopper into the sliding frame.

12. The system of claim 11, wherein the handle module comprises:

a knob rotatably coupled to the sliding frame;

a timing lever connected to the knob and configured to slide inwardly or outwardly of the knob based on a rotational direction of the knob;

a timing slider having a first timing-slider end connected to the timing lever and configured to move in conjunction with a movement of the timing lever; and a connecting wire having a first connecting-wire end connected to the timing slider and having a second connecting-wire end connected to the guide stopper.

13. The system of claim 11, wherein the rail comprises:

an upper rail disposed above the sliding frame, and a lower rail disposed below the sliding frame; and wherein the guide groove comprises:

an upper guide groove on the upper rail, and a lower guide groove on the lower rail.

14. The system of claim 13, wherein the upper guide groove comprises a busbar insertion slit, and wherein the busbar is inserted into the busbar insertion slit so that one end portion thereof protrudes to an inside of the upper guide groove.

15. The system of claim 13, wherein the upper guide groove comprises:

a first upper guide groove extending on a first upper-rail-longitudinal side of the upper rail, and a second upper guide groove extending on a second upper-rail-side of the upper rail;

and wherein the lower guide groove comprises:

a first lower guide groove extending on a first lower-rail-longitudinal side of the lower rail, and a second lower guide groove extending on a second lower-rail-longitudinal side of the lower rail.

16. The system of claim 15, wherein the second upper guide groove comprises:

an upper fixed groove part recessed inwardly from a bottom surface of the upper rail by a first depth, and an upper movable groove part recessed inwardly from the bottom surface of the upper rail by a second depth so as to be connected to the upper fixed groove part in a first width direction of the upper rail and extending in a first length direction of the upper rail; and wherein the second lower guide groove comprises:

a lower fixed groove part recessed inwardly from an upper surface of the lower rail by a third depth, and a lower movable groove part recessed inwardly from the upper surface of the lower rail by a fourth depth so as to be connected to the lower fixed groove part in a second width direction of the lower rail and extending in a second length direction of the lower rail.

17. The system of claim 16, wherein the guide stopper comprises:

an upper guide stopper inserted into the second upper guide groove; and a lower guide stopper inserted into the second lower guide groove.

18. The system of claim 17, wherein the sliding frame is configured to be fixed based on the upper guide stopper and the lower guide stopper being respectively arranged in the upper fixed groove part and the lower fixed groove part, and wherein the sliding frame is configured to be movable along the rail based on the upper guide stopper and the lower guide stopper being respectively arranged in the upper movable groove part and the lower movable groove part.

19. The system of claim 17, wherein, in response to the handle module pulling the upper guide stopper and the lower guide stopper toward an inside of the sliding frame, the upper guide stopper is configured to move from the upper fixed groove part to the upper movable groove part, and the lower guide stopper is configured to move from the lower fixed groove part to the lower movable groove part.

20. A rear sliding glass assembly comprising:

a fixed glass installed in a vehicle, wherein the fixed glass has an opening; and a sliding glass system connected to the fixed glass, wherein the sliding glass system is configured to open and close the opening, and wherein the sliding glass system comprises:

a rail;

a sliding glass portion including a heating wire, wherein the sliding glass portion is slidably connected to the rail;

an electrically conductive busbar on the rail and connected to an external power source; and a pin module electrically connecting the busbar to the heating wire, wherein the pin module is configured to maintain contact with the busbar when the sliding glass portion is moved, wherein the sliding glass portion comprises:

a sliding frame having an opening and an interference prevention groove extending in a width direction of the sliding frame, a locking portion disposed on the sliding frame and selectively fixing the sliding frame to the rail or switching the sliding frame to a slidably movable state, and a sliding glass coupled to a first sliding-frame surface of the sliding frame, wherein the sliding glass is configured to cover the opening of the sliding frame and wherein the sliding glass includes the heating wire, and wherein the pin module is configured to be slidable along the interference prevention groove.

* * * * *